US007671883B2

(12) United States Patent
Oka et al.

(10) Patent No.: US 7,671,883 B2

(45) Date of Patent: Mar. 2, 2010

(54) IMAGE RECORDING APPARATUS

(75) Inventors: Junichi Oka, Kyoto (JP); Takeshi Katayama, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 26 days.

(21) Appl. No.: 11/633,585

(22) Filed: Dec. 5, 2006

(65) Prior Publication Data

US 2007/0132832 A1 Jun. 14, 2007

(30) Foreign Application Priority Data

Dec. 8, 2005 (JP) ............................ 2005-354434

(51) Int. Cl.

*B41J 2/45* (2006.01)
*B41J 15/14* (2006.01)
*B41J 27/00* (2006.01)
*G02B 6/06* (2006.01)

(52) U.S. Cl. ...................... 347/238; 347/241; 347/256; 385/116

(58) Field of Classification Search ...................... None
See application file for complete search history.

(56) References Cited

U.S. PATENT DOCUMENTS 4,737,035 A 4/1988 Aoki et al.
6,211,897 B1 4/2001 Kessler et al.
6,233,001 B1 5/2001 Sasaki
6,738,086 B2 * 5/2004 Oka .......................... 347/241
6,810,175 B1 * 10/2004 Wey et al. ..................... 385/28
6,960,035 B2 * 11/2005 Okazaki et al. ............... 385/96
2005/0147138 A1 7/2005 Ishikawa et al.

FOREIGN PATENT DOCUMENTS

EP 1 266 763 A1 6/2002
JP 59-211830 11/1984
JP 05-208481 8/1993
JP 8-145630 A 6/1996
JP 2000141724 5/2000
JP 2000-318130 11/2000
JP 2003-237128 A 8/2003
JP 2005-262760 9/2005

OTHER PUBLICATIONS

European Search Report, issued in Corresponding European Patent Application No. 06025143.6-2304, dated on Nov. 28, 2007.

* cited by examiner

*Primary Examiner*—Matthew Luu
*Assistant Examiner*—Kendrick X Liu
(74) *Attorney, Agent, or Firm*—McDermott Will & Emery LLP

(57) ABSTRACT

A laser beam emitted from each semiconductor laser 27 is guided by a step index type multi-mode optical fiber, a graded index type multi-mode optical fiber deformable and movable with movement of a recording head, and a step index type multi-mode optical fiber, to be emitted from a light emitter toward an imaging optical system.

5 Claims, 4 Drawing Sheets

IMAGE RECORDING APPARATUS

BACKGROUND OF THE INVENTION

1. Field of the Invention

This invention relates to an image recording apparatus for recording an image by irradiating a recording material with light beams emitted from light sources.

2. Description of the Related Art

Such an image recording apparatus includes a recording drum rotatable about its axis with a recording material mounted peripherally thereof, and a recording head movable parallel to the axis of the recording drum and emitting light beams, thereby scanning the recording material with the light beams.

Such an image recording apparatus uses light sources such as semiconductor lasers or LEDs. To meet the requirement for an increased speed of image recording today, the number of semiconductor lasers or LEDs used in one image recording apparatus is on the increase, and thus a light source unit has been enlarged. In this connection, cooling of the light source unit has become important, and this further enlarges the light source unit.

For this reason, image recording apparatus have been proposed in Japanese Unexamined Patent Publications No. 2000-141724 and No. 2003-237128, in which light emitted from light sources fixed to a main body of the apparatus is guided by optical fibers to a recording head moving relative to a recording material.

In such image recording apparatus, one end of each optical fiber is fixed to the recording head. The other end of each optical fiber is connected to the light source fixed to the main body of the apparatus. Therefore, with movement of the recording head, the optical fibers also move while undergoing deformation. However, when the optical fibers deform in time of recording an image, speckles of the light beams move at the exit end with variations in the mode of light propagation. This could cause a problem of lowering the quality of the image formed.

That is, optical fibers can be classified into single mode optical fibers that transmit light in only one mode, and multi-mode optical fibers having a mixture of different transmitting modes. An image recording apparatus, since the light sources such as high-output semiconductor lasers or LEDs have large emitters, uses multi-mode optical fibers having a core diameter of at least about 50 μm, rather than single mode optical fibers having a core diameter of 5 μm or less.

The multi-mode optical fibers can be classified into step index type multi-mode optical fibers with a core having a constant refractive index, and graded index type multi-mode optical fibers with a core having a smooth distribution of refractive indexes.

An image recording apparatus in which light emitted from light sources fixed to a main body of the apparatus is guided by optical fibers to a recording head moving relative to a recording material may use step index type multi-mode optical fibers. In this case, when the optical fibers deform in time of recording an image, as noted above, speckles of the light beams will move at the exit end with variations in the mode of light propagation. This could cause a problem of lowering the quality of the image formed.

On the other hand, graded index type multi-mode optical fibers used in this type of image recording apparatus can eliminate the above problem of speckles of the light beams moving at the exit end with variations in the mode of light propagation. However, light will gather in central parts of the graded index type multi-mode optical fibers, and the degree of gathering is variable depending, for example, on affinity with the light sources. The degree of light gathering may not fully be controlled, leading to a problem of variations in image quality.

Japanese Unexamined Patent Publication H8-145630 (1996), though in a different technical field to this invention, discloses a technique of using graded index type multi-mode optical fibers and step index type multi-mode optical fibers. That is, this publication discloses an apparatus for monitoring a building or land, including support plates fixed to both sides of a part to be measured of the building or land, multi-mode optical fibers supported by the support plates, and light sources and light receivers with light attenuation evaluating units connected to opposite ends of the multi-mode optical fibers. The multi-mode optical fibers include a plurality of graded index type multi-mode optical fibers GI forming arcuate curved parts, and step index type multi-mode optical fibers SI connecting the step index type multi-mode optical fibers GI and having loop parts.

SUMMARY OF THE INVENTION

The object of this invention, therefore, is to provide an image recording apparatus capable of preventing lowering of image quality even when light emitted from light sources fixed to a main body of the apparatus is guided by optical fibers to a recording head moving relative to a recording material.

The above object is fulfilled, according to this invention, by an image recording apparatus for guiding light emitted from light sources fixed to a main apparatus body, through optical fibers, to a recording head movable relative to a recording material, the optical fibers comprising multi-mode optical fibers connected to the light sources; graded index type multi-mode optical fibers each having one end fixed immovable and connected to one of the multi-mode optical fibers, and deformable and movable with movement of the recording head; and step index type multi-mode optical fibers forming a light emitter at one end thereof for emitting light toward the recording material, and each having the other end connected to one of the graded index type multi-mode optical fibers, the step index type multi-mode optical fibers being fixed to the recording head.

This image recording apparatus is capable of preventing lowering of image quality even when the light emitted from the light sources fixed to the main apparatus body is guided by the optical fibers to the recording head moving relative to the recording material.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
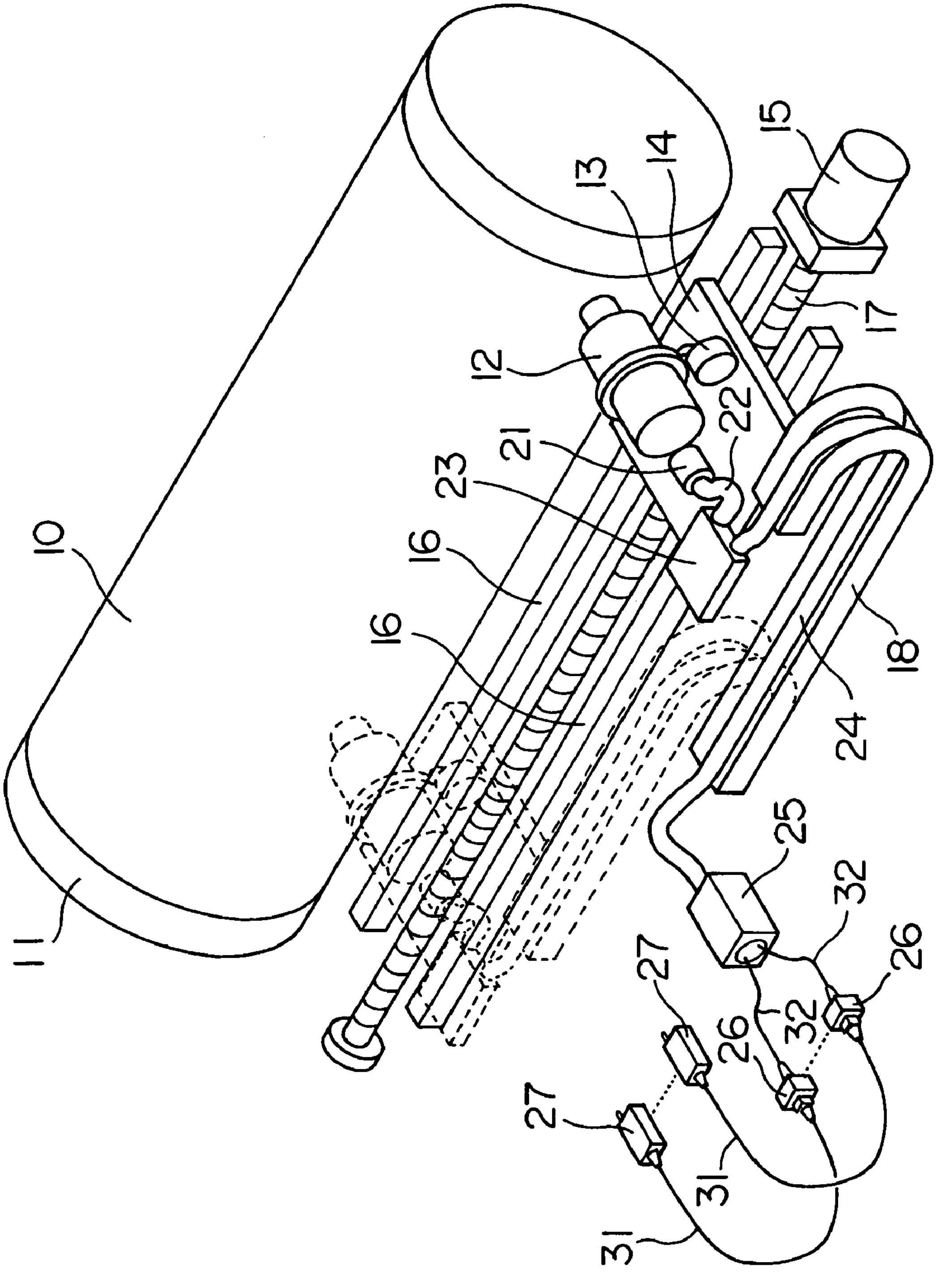
FIG. 1 is a perspective view showing a principal portion of an image recording apparatus according to this invention.

An embodiment of this invention will be described hereinafter with reference to the drawings. FIG. 1 is a perspective view showing a principal portion of an image recording apparatus in a first embodiment of the invention.

This image recording apparatus includes plural types of optical fibers for transmitting laser beams emitted from numerous semiconductor lasers 27 fixed to a main body of the apparatus to a recording head. The laser beams irradiate a recording material 10 mounted peripherally of a recording drum 11, through an imaging optical system 12 provided for the recording head.

Specifically, in this image recording apparatus, a laser beam emitted from each semiconductor laser 27 is guided by a step index type multi-mode optical fiber 31 connected to the semiconductor laser 27, a graded index type multi-mode optical fiber 32 connected to the step index type multi-mode optical fiber 31 at a connecting unit 26, and a step index type multi-mode optical fiber 33 (FIG. 2) connected to the graded index type multi-mode optical fiber 32 at an optical fiber connecting unit 23, to be emitted from a light emitter 21 toward the imaging optical system 12.

Each semiconductor laser 27 and step index type multi-mode optical fiber 31 are commercially available as a fiber coupled laser. The graded index type multi-mode optical fibers 32 extend separately on the side of the semiconductor lasers 27 up to a branch box 25, and are gathered into a fiber bundle 24 in an elastic resin, for example, on the side of the light emitter 21 after the branch box 25. Each pair of step index type multi-mode optical fiber 31 and graded index type multi-mode optical fiber 32 are mechanically connected at the connecting unit 26 by an adapter and a connector.

These semiconductor lasers 27, step index type multi-mode optical fibers 31, graded index type multi-mode optical fibers 32, branch boxes 25 and connecting units 26 are fixed to the main body of the image recording apparatus.

One end of the fiber bundle 24 of graded index type multi-mode optical fibers 32 is inserted in the optical fiber connecting unit 23. One end of a fiber bundle 22 of step index type multi-mode optical fibers 33 in an elastic resin, for example, is inserted in the optical fiber connecting unit 23, and the other end serves as the light emitter 21. The graded index type multi-mode optical fibers 32 and step index type multi-mode optical fibers 33 are connected to each other inside the optical fiber connecting unit 23.

Figure 2:
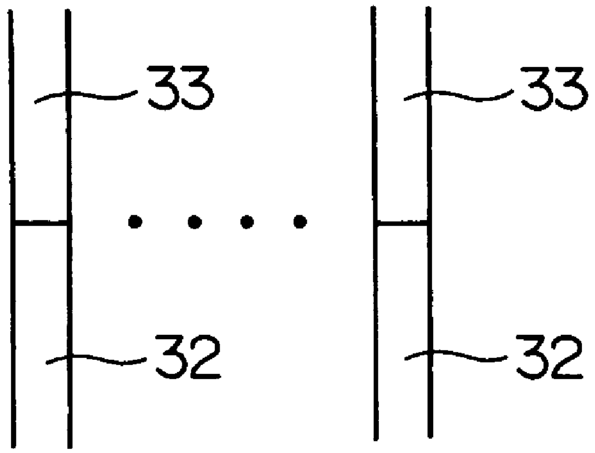
FIG. 2 is a schematic view showing a state of connection between graded index type multi-mode optical fibers and step index type multi-mode optical fibers.

FIG. 2 is a schematic view showing a state of connection between the graded index type multi-mode optical fibers 32 and step index type multi-mode optical fibers 33.

The graded index type multi-mode optical fibers 32 and step index type multi-mode optical fibers 33 are connected to each other by fusing their ends together so that the cores abut each other. However, these fibers may be connected mechanically.

The optical fiber connecting unit 23, the fiber bundle 22 of step index type multi-mode optical fibers 33 and the light emitter 21 are fixed to a support plate 14 of the recording head. The imaging optical system 12 and a stepping motor 13 for changing the magnification of the imaging optical system 12 also are fixed to the support plate 14 of the recording head. Thus, the optical fiber connecting unit 23, fiber bundle 22, light emitter 21, imaging optical system 12, stepping motor 13 and support plate 14 form parts of the recording head.

The light emitter 21 has a construction in which, in order to obtain laser beams of a constant pitch, forward ends of the numerous step index type multi-mode optical fibers 33 are supported by a support element.

The support plate 14 of the recording head is movable along a pair of guide members 16 extending parallel to the axis of recording drum 11. The support plate 14 has a nut attached to the lower surface thereof and meshed with a ball screw 17 rotatable by a motor 15. Thus, the support plate 14 is movable by the motor 15 back and forth parallel to the axis of recording drum 11.

The fiber bundle 24 of graded index type multi-mode optical fibers 32 is guided by a protective device 18 such as a cable bearer. With movement of the support plate 14 of the recording head, the fiber bundle 24 of graded index type multi-mode optical fibers 32 will move while undergoing deformation according to moving positions.

In this image recording apparatus, each semiconductor laser 27 is turned on and off by a controller, not shown, based on image data. The modulated laser beams emitted from the semiconductor lasers 27 are guided by the step index type multi-mode optical fibers 31, graded index type multi-mode optical fibers 32 and step index type multi-mode optical fibers 33. After being emitted from the light emitter 21 toward the imaging optical system 12, the laser beams form images on the recording material 10 by the action of the imaging optical system 12. The spot diameters and the like of the laser beams on the recording material 10 can be changed to desired values by changing magnification of the imaging optical system 12 which is driven by the stepping motor 13.

With the semiconductor lasers 27 turned on and off based on the image data, the recording drum 11 is rotated to move the recording material 10 in a primary scanning direction, and the recording head including the imaging optical system 12 is moved in a secondary scanning direction, thereby recording a two-dimensional image on the recording material 10. The recording material 10 used in this embodiment is a heat-sensitive material for recording images in response to heat generated by the laser beams.

In this image recording apparatus, with movement of the support plate 14 of the recording head, the fiber bundle 24 of graded index type multi-mode optical fibers 32 will move while being deformed according to moving positions. Particularly since the graded index type multi-mode optical fibers 32 are used as optical fibers, the problem noted hereinbefore that speckles of the light beams move at the exit end with variations in the mode of light propagation does not arise from the deformation of the graded index type multi-mode optical fibers 32.

In this image recording apparatus, the step index type multi-mode optical fibers 33 having one end thereof defining the light emitter 21 are fixed as the fiber bundle 22 to the support plate 14 of the recording head. Thus, the optical fibers 33 are not subjected to deformation, and therefore do not cause the problem of speckles of the light beams moving at the exit end with variations in the mode of light propagation. Since the laser beam spreads over the entire core diameter, the step index type multi-mode optical fibers 33 have a substantially uniform light quantity distribution, and the laser beam may be projected in a reduced size onto the recording material 10 effectively.

In the foregoing embodiment, the semiconductor lasers 27 and graded index type multi-mode optical fibers 32 are connected by the step index type multi-mode optical fibers 31. However, the step index type multi-mode optical fibers 31 may be replaced by graded index type multi-mode optical fibers as long as the latter are multi-mode optical fibers having a large core diameter to take in light from the semiconductor lasers 27 easily. Further, the graded index type multi-mode optical fibers 32 may be connected directly to the semiconductor lasers 27.

Figure 3:
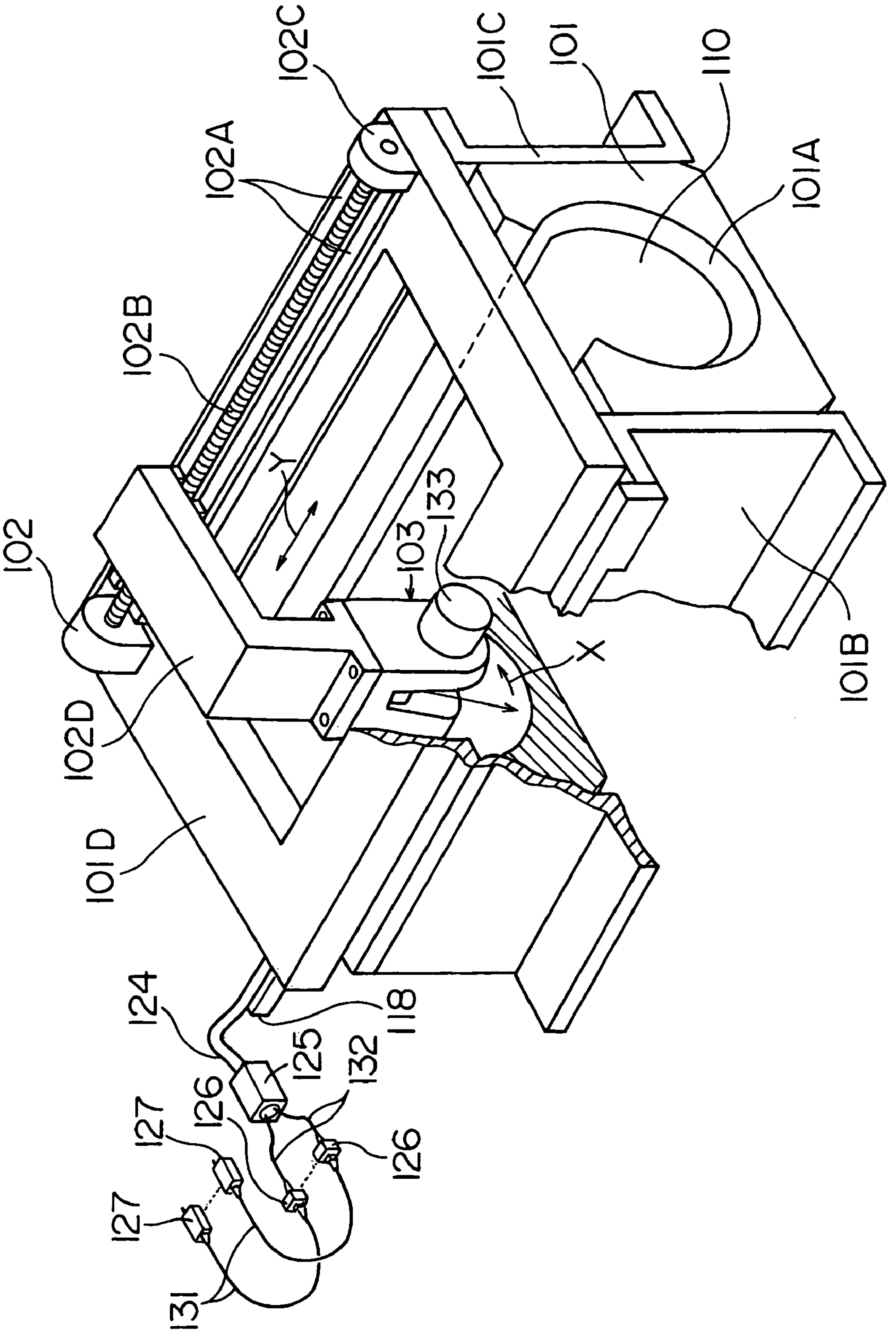
FIG. 3 is a perspective view showing a principal portion of an image recording apparatus in a second embodiment of this invention.
Figure 4:
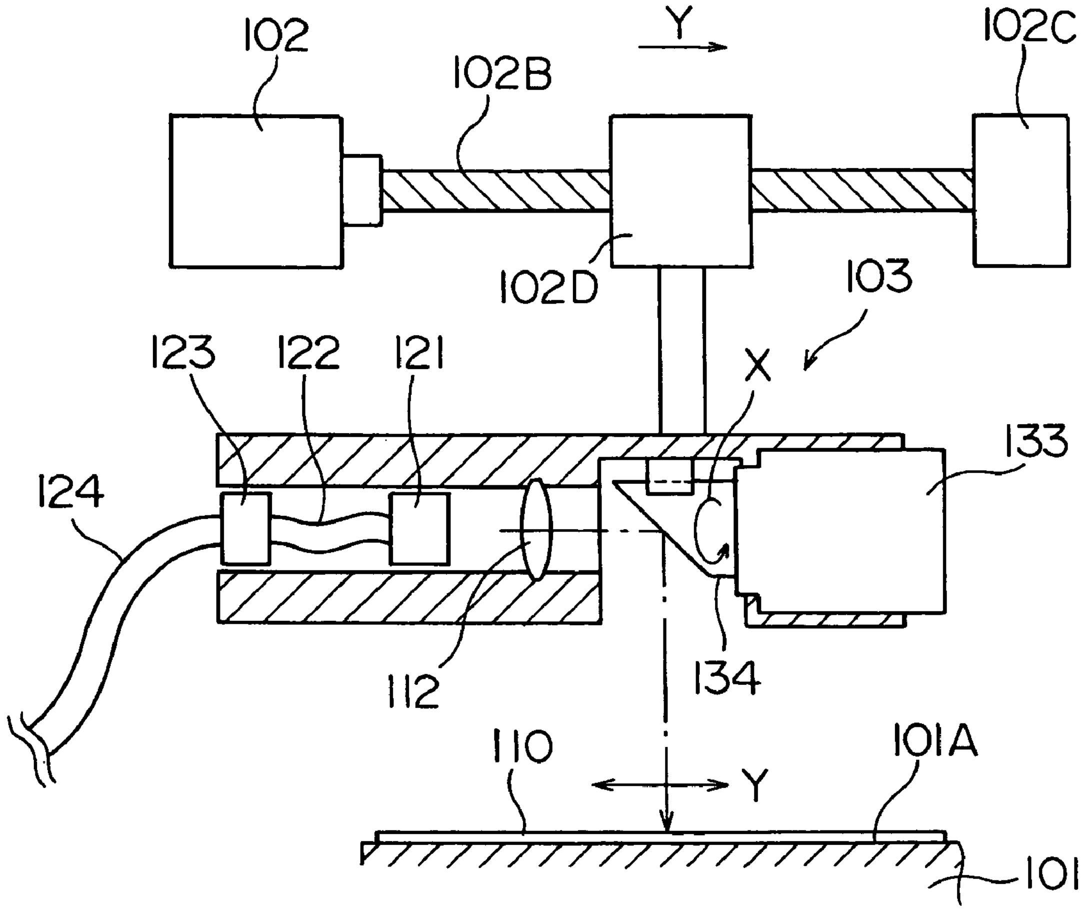
FIG. 4 is a schematic sectional view of a principal portion of the image recording apparatus in the second embodiment of this invention.

Another embodiment of this invention will be described next. FIG. 3 is a perspective view showing a construction of an image recording apparatus in a second embodiment of this invention. FIG. 4 is a schematic sectional view of a principal portion of the apparatus.

Referring to FIG. 3, a cylindrical drum 101 is supported on a base (not shown). A recording material 110 is fixed to the inner peripheral surface 101A of cylindrical drum 101. The inner peripheral surface 101A of cylindrical drum 101 is in the form of a hollow half cylinder opening at opposite ends and at top. A pair of supports 101B and 101C are arranged at opposite sides of the cylindrical drum 101. A secondary scan base 101D is mounted to bridge the supports 101B and 101C.

The secondary scan base 101D has, arranged thereon, a secondary san motor 102, two rails 102A extending axially of the motor 102, a ball screw 102B having one end thereof attached to a shaft of the motor 102, and a flange 102C rotatably supporting the other end of the ball screw 102B. An arm 102D is attached to the ball screw 102 to be movable along the rails 102A. The arm 102D has a recording head 103 secured to a distal, lower end thereof.

As shown in FIG. 4, the recording head 103 includes a deflector 134 rotatable in a direction of arrow X by a primary scan motor 133. The recording head 103 includes an imaging optical system 112 for emitting light beams toward the deflector 134. The deflector 134 causes the light beams emitted from the imaging optical system 112 to scan the cylindrical drum 101 circumferentially.

The recording head 103 is driven by the secondary scan motor 102 to move in a secondary scanning direction Y synchronously with primary scanning action of the light beams caused by the deflector 134.

The imaging optical system 112 of recording head 103 receives light beams from numerous semiconductor lasers 127 fixedly arranged outside the cylindrical drum 101. The light beams are guided by the following optical elements. Specifically, a laser beam emitted from each semiconductor laser 127 is guided to the imaging optical system 112 that is fixed to the recording head 103, by a step index type multi-mode optical fiber 131 connected to the semiconductor laser 127, a graded index type multi-mode optical fiber 132 connected to the step index type multi-mode optical fiber 131 at a connecting unit 126, a branch box 125 that gathers a plurality of optical fibers 132 into a fiber bundle 124, a step index type multi-mode optical fiber 133 connected to each graded index type multi-mode optical fiber 132 of the fiber bundle 124 at an optical fiber connecting unit 123, a fiber bundle 122 of a plurality of step index type multi-mode optical fibers 133, and a light emitter 121 formed at the other end of fiber bundle 122.

The graded index type multi-mode optical fibers 132 and step index type multi-mode optical fibers 133 are connected to each other inside the optical fiber connecting unit 123 by fusing their ends together so that the cores abut with each other. However, these fibers may be connected mechanically.

The optical fiber connecting unit 123, the fiber bundle 122 of step index type multi-mode optical fibers 133 and the light emitter 121 are fixed to the recording head 103.

The fiber bundle 124 of graded index type multi-mode optical fibers 132 is guided by a protective device 118 such as a cable bearer.

The plurality of semiconductor lasers 127, step index type multi-mode optical fibers 131, connecting units 126, graded index type multi-mode optical fibers 132 and branch box 125 are fixed to a base not shown. Thus, these components are free from influences of the movement in the secondary scanning direction of the recording head 103.

In the image recording apparatus in the second embodiment also, the graded index type multi-mode optical fibers 132 are used in the part movable with the recording head 103. This arrangement precludes the problem that speckles of the light beams move at the exit end with variations in the mode of light propagation.

The step index type multi-mode optical fibers 131 are used in the location not influenced by the movement of the recording head 103. This arrangement is free from the problem that speckles of the light beams move at the exit end with variations in the mode of light propagation occurring with movement of the recording head 103. Since the laser beam spreads over the entire core diameter, the step index type multi-mode optical fibers 133 have a substantially uniform light quantity distribution, and the laser beam may be projected in a reduced size onto the recording material 110 effectively.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2005-354434 filed in the Japanese Patent Office on Dec. 8, 2005, the entire disclosure of which is incorporated herein by reference.

What is claimed is:

1. In an image recording apparatus for guiding light emitted from light source fixed to a main apparatus body, through optical fiber, to a recording head movable relative to a recording material, said optical fiber comprising:

a multi-mode optical fiber connected to said light sources;

a graded index type multi-mode optical fiber having one end fixed immovable and connected to one of said multi-mode optical fiber, and deformable and movable with movement of said recording head; and a step index type multi-mode optical fiber forming a light emitter at one end thereof for emitting light toward said recording material, and having the other end connected to said graded index type multi-mode optical fiber, each end of said step index type multi-mode optical fiber being fixed to a support plate of said recording head, wherein said recording material is mounted on a rotatable recording drum and said recording head is movable parallel to the rotary axis of said recording drum.

2. An image recording apparatus as defined in claim 1, wherein said optical fiber connected to said light source is a step index type multi-mode optical fiber.

3. An image recording apparatus as defined in claim 1, wherein said graded index type multi-mode optical fiber and said step index type multi-mode optical fiber forming a light emitter at one end thereof, are connected to each other at an optical fiber connecting unit disposed on said recording head.

4. An image recording apparatus as defined in claim 3, wherein:

said recording material is mounted on an inner peripheral surface in form of a hollow half cylinder of a cylindrical inner surface drum; and said recording head is movable parallel to an axis of said cylindrical inner surface drum, and has a deflector for causing light beams emitted from said step index type multi-mode optical fiber to scan said cylindrical inner surface drum circumferentially.

5. An image recording apparatus as defined in claim 1, wherein the graded index type multi-mode optical fiber comprises a plurality of optical fibers.

* * * * *